United States Patent [19]
Price et al.

[11] 3,824,743
[45] July 23, 1974

[54] MACHINE TOOL CONTROL SYSTEM

[75] Inventors: Ralph E. Price; Stanley C. Schoonover, both of Waynesboro, Pa.

[73] Assignee: Landis Tool Company, Waynesboro, Pa.

[22] Filed: May 22, 1973

[21] Appl. No.: 362,877

[52] U.S. Cl. ............................ 51/165.71, 51/165.87
[51] Int. Cl. ............................................ B24b 49/00
[58] Field of Search .......... 51/165 R, 165.71, 165.8, 51/165.87

[56] References Cited
UNITED STATES PATENTS
3,557,995   1/1971   Price .................................. 51/165.8
3,694,970   10/1972  Schoonover ....................... 51/165.71

Primary Examiner—Harold D. Whitehead
Attorney, Agent, or Firm—Keith D. Moore

[57] ABSTRACT

A machine tool control system moves a grinding wheel from a retracted position to a forward position by applying hydraulic fluid to a hydraulic cylinder to effect a rapid forward movement of the grinding wheel whereupon further movement of the grinding wheel to a final position is effected by supplying a predetermined number of pulses to a stepping motor for driving a feed screw in accordance with a predetermined sequence of grinding movements. The actual advancement of the grinding wheel is monitored by an absolute multiturn encoder rotatably associated with the feed screw and producing a signal which is compared to a combined signal representative of the desired size of the workpiece in the range of grinding. With each grinding sequence, the portion of the feed range signal is reduced to create a difference from a signal produced by the encoder so as to operate a sequence controller to effect advancement of the grinding wheel by supplying pulses to a stepping motor drive circuit connected to controlling relation with a stepping motor connected to a feed screw through a gear train. When the workpiece is ground to the desired size, the sequence controller operates to reversely rotate the stepping motor and reverse the application of hydraulic fluid to return the grinding wheel to a retracted position. The desired size of the workpiece and the advancement of the grinding wheel under the control of the encoder are displayed by suitable gauges on a display panel. The mechanical relation of the encoder to the grinding wheel may be calibrated by a calibration offset signal for increasing or decreasing the signal produced by the encoder indicating the position of the grinding wheel. To enable the actual position of the grinding wheel to be varied without disturbing the relationship between the encoder and the stepping motor in associated circuitry, the feed screw is driven through a gear train including a differential. The encoder is associated with the input gear of the differential while a compensating motor and associated circuitry are provided for rotating the output gear of the differential without effecting the rotational movement of the encoder.

6 Claims, 2 Drawing Figures

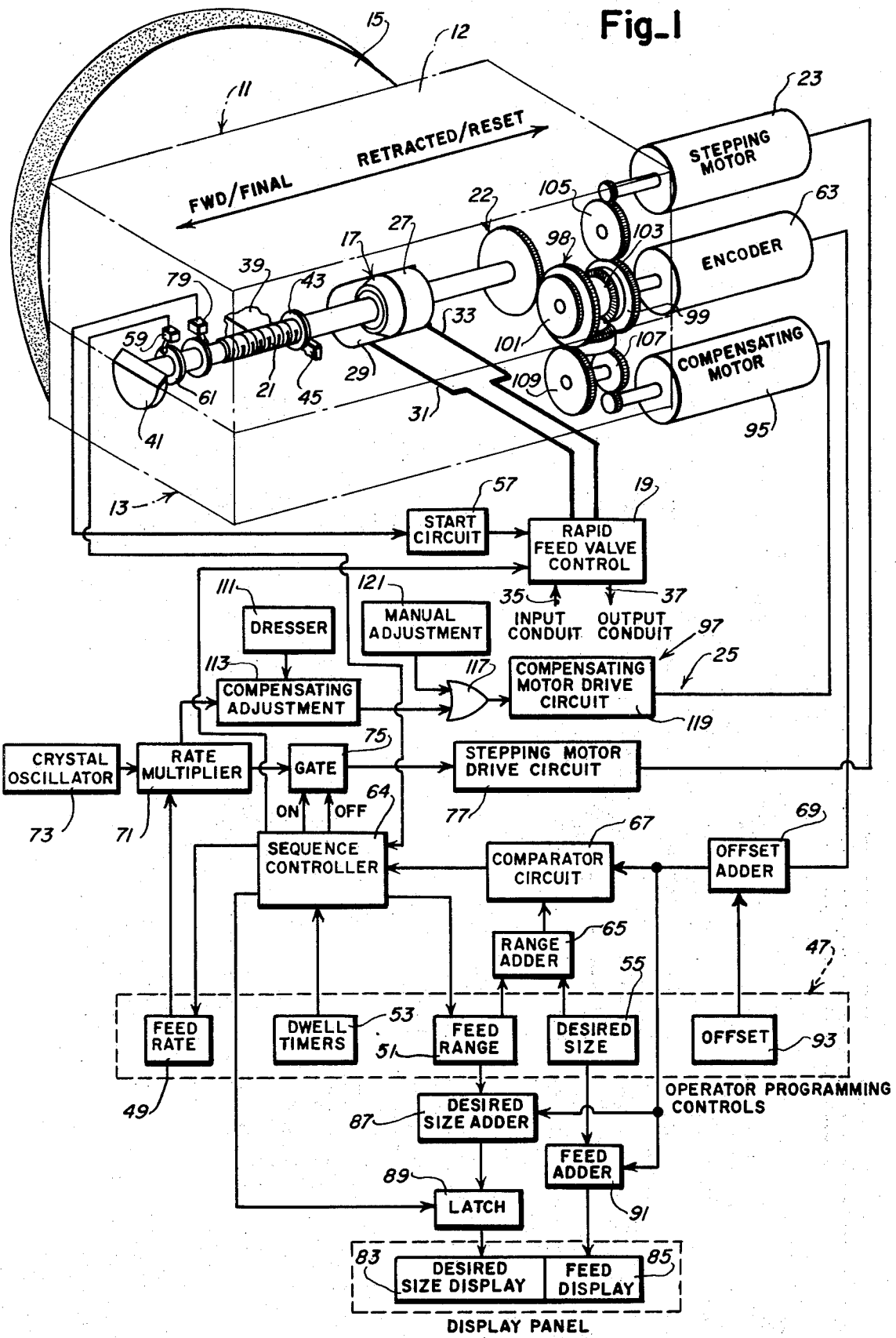
Fig_1

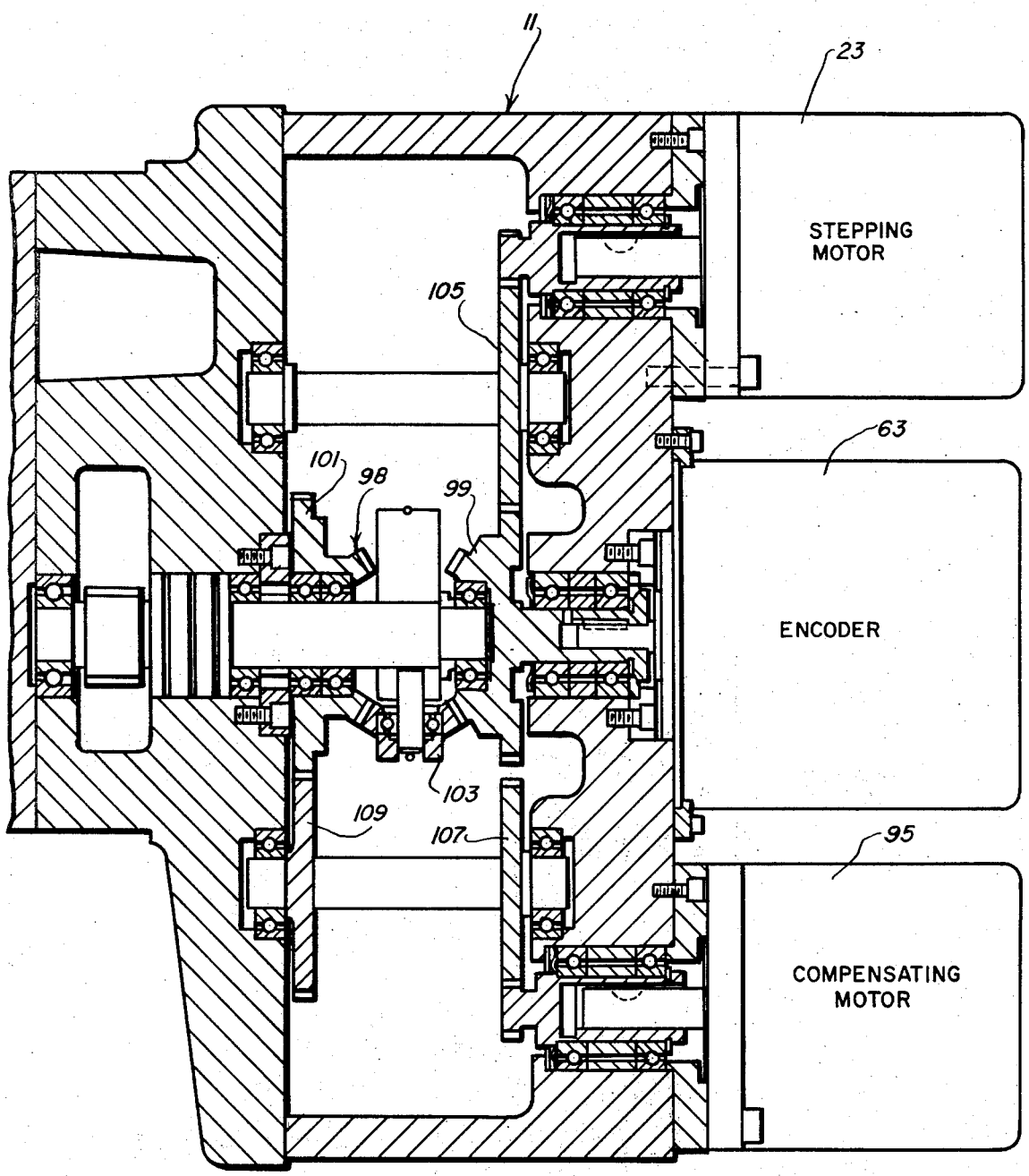
Fig_2

3,824,743

MACHINE TOOL CONTROL SYSTEM

This invention relates to a control system for a machine tool, for example a grinding machine, in which the grinding wheel is advanced from an initial starting position to a final position in accordance with pulses representative of a given distance so as to effect grinding of a workpiece to a desired size, and more particularly to a control system for accurately determining the actual advancement of the grinding wheel during the grinding operations so that the workpiece may be ground to the desired size.

In grinding a workpiece to a desired size with a grinding machine, the workpiece is loaded into a suitable supporting mechanism while the grinding wheel is located at a base reference position, and then the grinding wheel is advanced into engagement with the workpiece and toward a final position at which the workpiece will be ground to the desired size. The advancement of the grinding wheel is typically effected by a screw which is rotatably driven by a stepping motor which is energized by a series of pulses representative of the distance that the grinding wheel is to be advanced. However, due to slack in the gears or other causes, the advancement of the grinding wheel may not coincide with the distance represented by the series of pulses supplied to the stepping motor so that the workpiece may not be ground to the desired size.

To be certain that the workpiece is ground to the desired size, the actual size of the workpiece may be measured by a suitable gauge and the grinding wheel may be further advanced until the desired size is achieved. In a fully automated machine, a gauge may be automatically moved into engagement with the workpiece upon completion of the advancement of the grinding wheel to the predetermined position, and if the workpiece is oversized, then the grinding wheel may be further advanced under the control of the gauge until the desired size is achieved, whereupon the grinding wheel may then be returned to the initial position to enable another workpiece to be loaded into the machine. However, such an arrangement is expensive and limited to fully automated machines. In less automated machines, typically used to grind smaller workpieces, an operator may measure the workpiece with a hand gauge giving a visual indication of the actual size of the workpiece, and if the workpiece is oversized, then the operator may cause the grinding wheel to be further advanced to grind the workpiece to the desired size. Subsequently, the proper size of the workpiece may be confirmed by the operator by again measuring the workpiece with the hand gauge. However, such an arrangement is disadvantageous because it requires the presence of an operator who must measure the actual size of the workpiece and effect further advancement of the grinding wheel.

Accordingly, an object of the present invention is to provide a machine tool control system for accurately monitoring the actual advancement of a grinding wheel to insure the grinding of a workpiece to a predetermined desired size.

Still other objects, features and advantages of the present invention will become apparent to those skilled in the art from a reading of the following detailed description of the present invention, taken in conjunction with the accompanying drawings, wherein:

FIG. 1 is a diagrammatic view of a grinding machine illustrating the drive mechanism and a schematic block diagram of a control circuit for operating the drive mechanism; and FIG. 2 is a cross-sectional view of a portion of the drive mechanism shown diagrammatically in FIG. 1.

Referring now in detail to the figures in the drawing, there is shown diagrammatically a grinding machine, generally indicated 11, for grinding a workpiece, not shown, to a selected size. Although not shown, the workpiece may be supported in a conventional manner between a head stock and a tail stock of a work support mounted at one end of a bed 13 of the grinding machine 11. Also mounted on the bed 13 is a rotatably driven grinding wheel 15 which is carried by a wheel base 12 which is slidably supported on the bed 13 for movement relative to the workpiece. To grind the workpiece to a selected size, the grinding wheel 15 is moved from a retracted position to a forward position by a rapid hydraulic feed arrangement, generally indicated 17, which is controlled by a rapid feed valve controller 19. Upon reaching the forward position, the grinding wheel 15 is further advanced at a slower rate toward a final position by a feed screw 21 which is rotatably driven through a gear drive, generally indicated 22, by an electric motor 23 which is controlled by a grinding control circuit, generally indicated at 25. Upon grinding the workpiece to a selected size as determined by the final position to which the grinding wheel 15 is advanced, the grinding wheel 15 may then be removed from the workpiece by reversely driving the feed screw 21 to move the wheel base 12 to a reset position and by operating the rapid feed valve controller 19 to drive the wheel base 12 from the forward position to the retracted position.

As shown, the rapid hydraulic feed arrangement 17 is in the form of a piston 27 slidably disposed in a cylinder 29 which is formed in the bed 13 of the grinding machine 11 for moving the wheel base 12 between the retracted position and the forward position. The hydraulic feed arrangement 17 includes a pair of hydraulic conduits 31, 33 leading from respective openings at the opposite ends of the cylinder 29 to the rapid feed valve controller 19 for controlling the flow of hydraulic fluid to the cylinder 29. The rapid feed valve controller 19 may be in the form of a conventional solenoid-controlled valve having input and output conduits 35, 37 respectively, leading to a supply of hydraulic fluid, not shown, in a conventional manner. The piston 27 is secured to the feed screw 21 which threadably engages a half nut 39 associated with the wheel base 12 for moving the grinding wheel 15 relative to the bed 13 of the grinding machine 11.

When the rapid feed valve controller 19 is operated to move the grinding wheel 15 from the retracted position to the forward position, hydraulic fluid is supplied through the conduit 33 to the rearward end of the cylinder 29 so as to push the piston 27 forwardly until the end of the feed screw 21 abuts against a forward stop 41. To move the wheel base 12 from the forward position to the retracted position, the rapid feed valve controller 19 is operated to supply hydraulic fluid through the conduit 31 to the forward end of the cylinder 29 to push the piston 27 rearwardly until a collar 43 on the feed screw 21 abuts a rearward stop 45. The manner of supplying hydraulic fluid to the rapid feed valve controller 19 and the means by which the rapid feed valve controller 19 operates to control the flow of hydraulic fluid to the cylinder 29 are not shown since they form no part of the present invention and may be desirably conventional.

In grinding the workpiece to a selected size, the grinding wheel 15 is typically advanced from the forward position to the final position in a sequence of grinding movements in which the grinding wheel is advanced at a much slower rate than the rapid feed rate by which the grinding wheel is moved from the retracted position to the forward position. As more particularly described in copending U.S. Ser. No. 45,829, now U.S. Pat. No. 3,716,949, dated Feb. 20, 1973, the grinding wheel 15 is advanced over a preselected range at a preselected rate until reaching the end point of the selected range whereupon there is a predetermined dwell period before beginning the next grinding movement, and there may be several sequences of grinding movements with different feed ranges, different feed rates and different dwell periods until the workpiece is finally ground to the selected size when the grinding wheel 15 reaches the final position. At the final position, there is a dwell period commonly referred to as the "spark out" period, and upon completion of the "spark out" period the grinding wheel 15 may be withdrawn from the workpiece to a reset position.

To advance the grinding wheel 15 from the forward position to the final position, the feed screw 21 is rotatably driven by a motor 23, which may be a suitable electric stepping motor, and which is operated in accordance with pulses supplied from the grinding control circuit generally indicated at 25, with each pulse being representative of a predetermined feed distance or degree of rotation of the feed screw 21. To enable an operator to establish a program of grinding movements, the grinding control circuit 25 includes operator programming controls, generally indicated at 47 which consists of feed rate switches 49, feed range switches 51, dwell timers 53 and a desired size switch 55 which may be individually set by the operator. The feed range switches 51 determine the total number of pulses to be supplied to the electric stepping motor 23 and thereby define the distance over which the grinding wheel 15 is advanced, the feed rate switches 49 determine the rate at which the selected number of pulses are supplied to the motor 23, the dwell timers determine the amount of time that the grinding wheel 15 will remain at the end point of a corresponding feed range before undergoing further movement and the desired size switch 55 determines the final size of the grinding workpiece. The details of the movement of the grinding wheel 15 during a grinding operation, and the details of the feed range switches 51, the feed rate switches 49 and the dwell timers 53 are not described since they are adequately explained in the above mentioned patent, to which reference may be made for additional details of the involved grinding control circuit 25. The desired size switch 55 is similar to the feed range switches 51.

To initiate the operation of the grinding machine 11, a suitable start switch 57 may be actuated to supply a start signal to the rapid feed valve controler 19 so as to cause hydraulic fluid to be supplied to the rearward end of the cylinder 29 to move the grinding wheel 15 from the retracted position to the forward position whereupon the end of the feed screw 21 abuts against the forward stop 41. Upon reaching the forward stop 41, a limit switch 59 is operated by a projection 61 associated with the feed screw 21 so as to provide a signal to initiate the operation of the grinding control circuit 25.

At the beginning of the operation of the grinding control circuit 25, the position of the grinding wheel 15 as determined by the feed screw 21, is indicated by the combined signals of the desired size switch 55 and feed range switches 51 which corresponds with a binary coded decimal signal produced by a suitable absolute multiturn encoder 63 which is rotatably associated with the feed screw 21. As shown, the signals produced by the feed range switches 51 and the desired size switch 55 are received by a range adder 65 which supplies a total signal to a comparator circuit 67, which also receives the signal from the absolute encoder 63 through an off-set adder 69 which functions in a manner to be described below.

When the signal from the limit switch 59 is received by the sequence controller 63, the sequence controller supplies operating signals to the feed rate switch 49 and the feed range switch 51 determining the first grinding sequence. The feed rate switch 49 operates a rate multiplier 71 which receives signals from a crystal oscillator 73 so as to produce a series of pulses at the rate determined by the selected feed rate switch 49. When the feed range switch 51 is actuated by the signal from the sequence controller 64, the signal representative of the feed range for the first grinding sequence is subtracted from the range adder so as to reduce the signal supplied to the comparator circuit and cause an actuating signal to be supplied to the sequence controller 64. The sequence controller 64 operates in response to the signal from the comparator circuit to supply an ON signal to a gate 75 so as to enable pulses to pass from the rate multiplier 71 to a suitable stepping motor drive circuit 77 for driving the stepping motor 23 to advance the grinding wheel 15.

As the grinding wheel 15 is advanced during the first grinding sequence, the rotation of the feed screw 21 operates the encoder 63 so as to decrease a signal being supplied to the comparator circuit 67, and when the signal from the encoder 63 again equals the signal from the range adder 65, the comparator circuit 67 removes the actuating signal to the sequence controller 64 which in turn supplies an OFF signal to the gate 75 to stop the series of pulses being supplied to the stepping motor drive circuit 77. At the same time, sequence controller 64 initiates the operation of the dwell timer 53 associated with the first grinding sequence. Upon completion of the operation of the selected dwell timer 53, the sequence controller is again actuated to initiate another grinding sequence.

In the manner of operation explained above, the sequence controller 64 may advance the grinding wheel 15 through a series of grinding sequences until the workpiece is ground to the desired size with the grinding wheel at the final position. Upon reaching the final position, the grinding machine 11 undergoes a final dwell period, which is generally referred to as the "spark out" period, and when the "spark out" period is completed the sequence controller is actuated by the dwell timer 53 determining the "spark out" period to reset the grinding wheel to the retracted position for grinding another workpiece in the programmed grinding sequence.

Upon completion of the grinding operation, the grinding machine 11 is reset by the sequence controller 64 for grinding another workpiece. To reset the grinding machine 11, the sequence controller actuates the feed range switches 51 to again supply a signal to the range adder 65 representative of the distance through which the grinding wheel was advanced during the previous grinding operation. Since the combined signals of the desired size switch 55 and the feed range switches 51 is now greater than the signal being supplied by the encoder 63, an imbalance is produced in the comparator circuit 67 which supplies an actuating signal through the sequence controller 64. The sequence controller 64 operates in response to the signal from the comparator circuit 67 to supply an ON signal to the gate 75 to enable pulses to be supplied from the rate multiplier 71 to the stepping motor drive circuit 77 for reversely rotating the stepping motor 23. In the reset mode, pulses are supplied to the stepping motor control circuit 77 at a relatively high frequency rate until the signal produced by the encoder 63 again equals the signal being supplied by the range adder 65 to the comparator circuit 67 which thereupon removes the actuating signal to the sequence controller 64 which in turn supplies an OFF signal to the gate 75 to prevent the passage of further pulses to the stepping motor drive circuit 77. In addition, during the reset mode, the sequence controller 64 supplies a retract signal to the rapid feed valve controller 19 so as to cause hydraulic fluid to be supplied to the forward end of the cylinder 29 to push the grinding wheel base 17 rearwardly to the retracted position. Upon reaching the retracted position, another limit switch 79 is operated which supplies an enable signal to the start circuit 81 to enable start circuit to subsequently supply another start signal to the rapid feed valve controller 19 for another grinding operation.

To enable an operator to visual observe the desired size to which the workpiece is to be ground as well as the rate of advancement of the grinding wheel 15 for the desired size, the grinding machine 11 is provided with a suitable display panel having a desired size display gauge 83 and a feed display gauge 85. At the beginning of the operation of the grinding control circuit 25, the signal from the encoder 63 which is representative of the actual position of the grinding wheels 15 is supplied to a desired size adder 87 which also receives a signal from the feed range switches 51, thereby producing a signal representative of the desired size of the workpiece. The signal from the desired size adder is supplied to the desired size display 83 by a latching circuit 89 which serves to maintain the display of the desired size throughout the grinding operation. At the same time, the signal from the encoder is supplied to a feed adder 91 which also receives a signal from the desired size switch 55 so as to produce a feed display signal indicative of the amount of stock to be ground from the workpiece during the grinding operation. As the grinding wheel 15 is advanced toward the final position under the control of the grinding control circuit 25, the signal from the encoder decreases, thereby reducing the feed display until the signal from the encoder 63 equals the signal from the desired size switch 55 whereupon the feed display will indicate that the workpiece has been ground to the desired size.

If the operator desires to ground the workpiece to a different final size, then the desired size switch 55 may be manually operated to change the signal being supplied to the range adder 65, which in turn alters the signal being supplied to the comparator circuit 67. Since the signal from the range adder 65 is no longer equal to the signal being received from the encoder 63, the resulting imbalance causes the comparator circuit 67 to supply an actuating signal to the sequence controller 64. Upon receiving the actuating signal, the sequence controller 64 supplies an ON signal to the gate 75 to enable pulses from the rate multiplier to be supplied to the stepping motor drive circuit 77 to move the grinding wheel until the signal from the encoder 63 again equals the signal from the range adder 65. At the same time, the sequence controller 64 actuates the latch circuit 89 associated with the display panels, thereby enabling the new desired size of the workpiece to be displayed by the desired size display indicator 83.

If the relationship of the encoder 63 with the grinding machine 11 is disturbed for any reason, for example by repair work in which these encoders 63 are temporarily removed from the grinding machine 11, then it becomes necessary to establish the proper mechanical relationship between the encoder 63 and the grinding machine 11. The calibration of the grinding machine may be effected by grinding a workpiece to a desired diameter and measuring the ground workpiece to determine the difference between the actual size of the workpiece and the size indicated by the signal from the encoder 63. If the workpiece is not ground to the actual desired size, then the signal from the encoder 63 which is supplied to the comparator circuit 67 may be buried until the workpiece is ground to the proper size. As previously mentioned, the signal from the encoder 63 is supplied to the comparator circuit 67 through an offset adder 69 which also receives a signal from a calibration offset switch 93 which is located with the other operator programming controls. If the ground workpiece is oversized, then the signal from the encoder may be reduced by operating the calibration offset switch 93 to reduce the output of the offset adder 69. Conversely, if the workpiece is being ground undersized, then the calibration offset switch 93 may be operated to increase the encoder signal being supplied to the comparator circuit 67 by the offset adder 69.

During the course of operating the grinding machine 11, it often becomes necessary to compensate for varying factors, for example the gradually diminishing diameter of the grinding wheel as a result of repeated grinding operations. In addition, it is also sometimes desirable to manually advance the grinding wheel in a grinding operation for special purposes. To enable the actual position of the grinding wheel to be varied without disturbing the relationship between the encoder 63 and the stepping motor 23 and associated controls, the grinding machine 11 is provided with a compensating motor 95 and an associated control circuit, generally indicated at 97, for rotating the feed screw 21 without rotating the encoder 63. As more particularly shown in FIG. 2, the feed screw 21 is driven by the stepping motor 23 through a gear train 22 which includes a differential, generally indicated at 98, having input and output gears 99, 101 respectively which are interconnected by a spider gear 103. The feed screw 21 is geared to the output gear 101 of the differential 98 while the stepping motor drives the input gear 99 through a suitable idler gear 105. The compensating motor 95 rotatably drives the output gear 101 of the differential 97 by means of a pair of idler gears 107, 109 carried on a common shaft with the gear 109 engaging output gear 101 of the differential 97.

When it becomes necessary to change the actual position of the grinding wheel 15 to compensate for the reduced diameter of the grinding wheel such as may occur as a result of the dressing operation, a suitable dresser 111 produces a signal representative of the reduced size of the grinding wheel 15. The signal from the dresser 111 is supplied to a compensating adjustment circuit 113 to enable a compensating motor 95 to be driven in accordance with pulses received from the rate multiplier 71. The pulses from the compensating adjustment circuit 118 are supplied through a suitable OR circuit 117 to a suitable compensating motor drive circuit 119 which operates to drive the compensating motor in accordance with the signals from the dresser 111. The operation of the compensating motor 95 rotates the output gear 101 to the differential 98 to advance the grinding wheel 15 to a desired position. Since the compensating motor 95 rotatably drives only the output gear 101 associated with the feed screw 21, the encoder 63 which is mechanically connected to the input gear of the differential 99 remains stationary so as to preserve the relationship of the encoder 63 with the stepping motor 23 and the associated circuitry. Alternatively, the compensating motor 95 may be driven by a manual adjustment circuit 121 producing suitable electrical signals which are supplied to the compensating motor drive circuit 119 through the OR gate 117.

What is claimed is:

1. In a grinding machine having a grinding wheel supported for slidable movement relative to a workpiece, a hydraulic system for slidably advancing the grinding wheel from a retracted position to a forward position, and a feed screw rotatably driven by a stepping motor under the control of a stepping motor control circuit for advancing the grinding wheel from the forward position to a final position in a predetermined sequence of grinding movements to grind the workpiece to a desired size, the improvement comprising:

an adjustable desired size switch providing a binary decimal signal representative of the desired size of the workpiece, a plurality of adjustable feed range switches each providing selectively adjustable binary decimal signals representative of the advancement of the grinding wheel during a corresponding grinding sequence to grind the workpiece to the desired size, an adder for receiving the signals from said desired size switch and from said plurality of feed range switches to produce an output signal representative of the total of the combined signals, an absolute multiturn encoder rotatably associated with said feed screw for producing a binary decimal signal representative of the actual position of said grinding wheel relative to the workpiece, a comparator circuit for receiving and comparing the signals from said adder and said encoder and being operable in response to a difference between the compared signals for producing an output signal representative of the difference between the actual position and the programmed position of said grinding wheel, a sequence controller operable in response to the output signal from said comparator circuit for operating said stepping motor control circuit to move the grinding wheel to a position to equalize the signals from said adder and said absolute encoder, and said sequence controller being operable to sequentially remove from said adder the signals produced by said plurality of adjustable feed range switches to cause successive differences between the signal provided by said adder and the signal provided by said absolute encoder to sequentially advance said grinding wheel to grind the workpiece to the size represented by the signal from said adjustable desired size switch.

2. In a grinding machine according to claim 1, the combination further comprising:

an offset adder for receiving the signal from said absolute encoder and supplying a corresponding output signal to said comparator circuit, an adjustable calibration offset switch for producing a selectively adjustable binary decimal signal representative of a measured position of the grinding wheel and the signal being produced by said absolute encoder, and said offset adder being operable in response to receipt of the signal from said adjustable calibration offset switch for varying the corresponding encoder signal being supplied to said comparator circuit.

3. In a grinding machine according to claim 1, the combination further comprising:

a differential gear arrangement having an output gear connected to said feed screw and an input gear driven by said stepping motor, said encoder being connected to said input gear for rotational movement therewith to vary the signal representative of the actual position of said grinding wheel, a compensating stepping motor for driving said output gear of said differential gear arrangement to move said grinding wheel independently of said absolute encoder, and a compensating motor control circuit for operating said compensating motor to move said grinding wheel independently of the signals from said adjustable desired size switch and said plurality of programmable feed range switches.

4. In a grinding machine according to claim 1, the combination further comprising:

a feed adder operable in response to receipt of the signal representative of the desired size of the workpiece from said desired size switch and the signal representative of the position of the grinding wheel from said absolute encoder for producing a resultant difference signal representative of the advancement of the grinding wheel, and a range display gauge operable in response to the resultant difference signal from said feeder adder to provide a visual indication of the feeding movement of the grinding wheel.

5. In a grinding machine according to claim 1, the combination further comprising:

a desired size adder operable in response to receipt of the signal representative of the position of the grinding wheel from said absolute encoder and the signal representative of the range of advancement of the grinding wheel from said plurality of feed range switches to produce a resultant difference signal representative of the desired size of the workpiece, a desired size display gauge operable in response to the resultant difference signal from said desired size adder to provide a visual indication of the desired size of the workpiece, a latch circuit for receiving the signal from said desired adder at the beginning of a grinding operation and supplying the signal to said desired size display gauge, said latching circuit being operable to maintain the desired size signal to the desired size display gauge during the grinding operation, and said latching circuit being operable to an actuating signal from the sequence controller upon the completion of a grinding operation for enabling another resultant difference signal from said desired size adder to said desired size display gauge.

6. A machine tool comprising
a grinding wheel having a radius which decreases with use, and
means for precisely and repetitively radially displacing said grinding wheel towards a workpiece to be ground so that the peripheral portion of said grinding wheel radially proximate the workpiece will be displaced from an initial non-constant position to a final predetermined position, including
an encoder adapted to produce a digital representation of the actual position of the radially proximate peripheral portion intermediate said final predetermined position and a second predetermined position, and
means for selectively displacing said radially proximate peripheral position from said non-constant position to said second predetermined position without changing the digital representation of said encoder.

* * * * *